R. R. RICKETTS.
DISPENSING RECEPTACLE.
APPLICATION FILED JUNE 8, 1908.
916,783.
Patented Mar. 30, 1909.
4 SHEETS—SHEET 1.
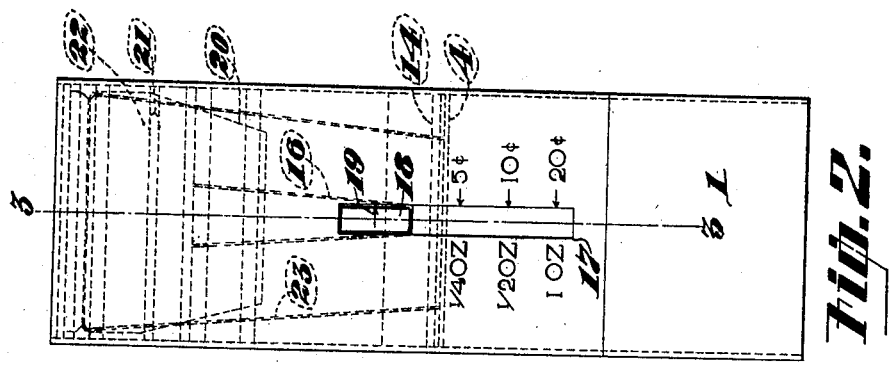
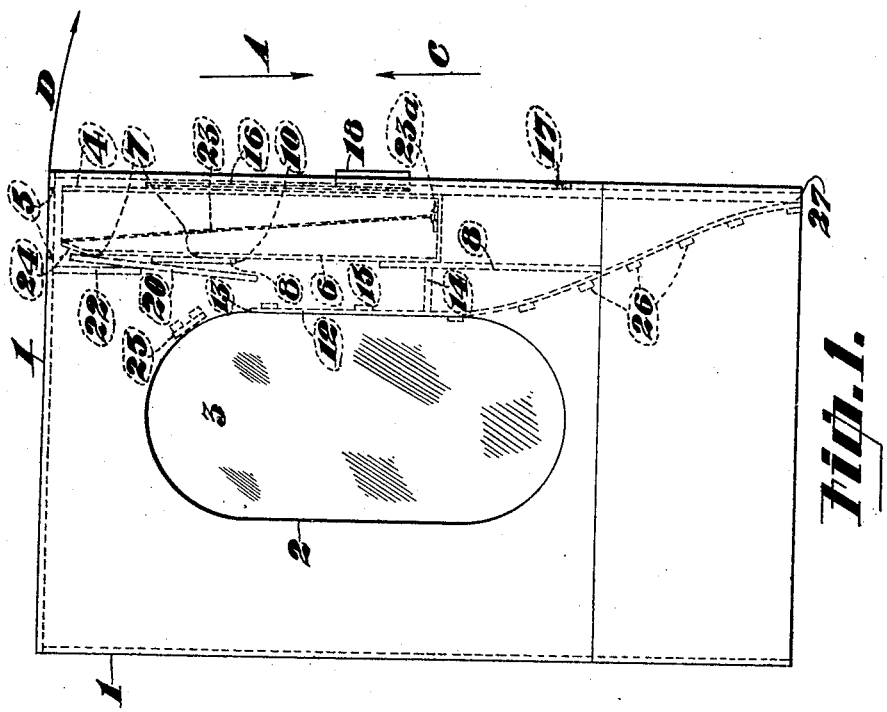
Witnesses:
J. Waldo Chrisinger
Elliott R. Goldsmith
Inventor:
Richard R. Ricketts,
By Hugh V. Wagner
His Attorney

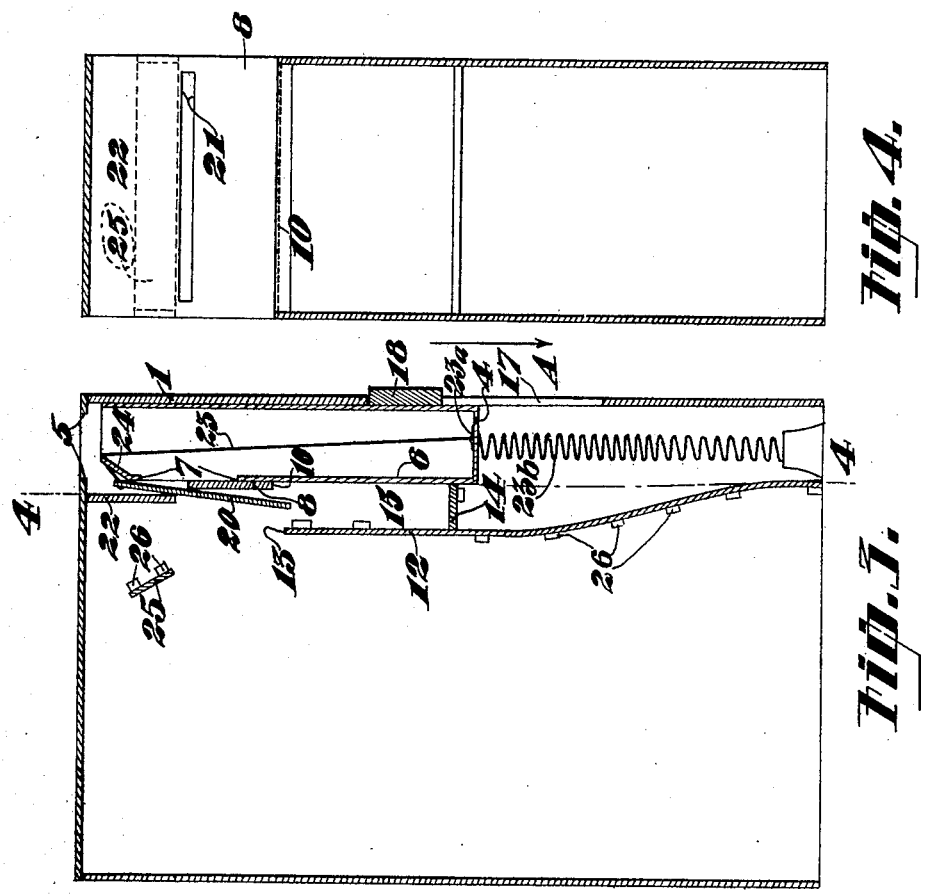

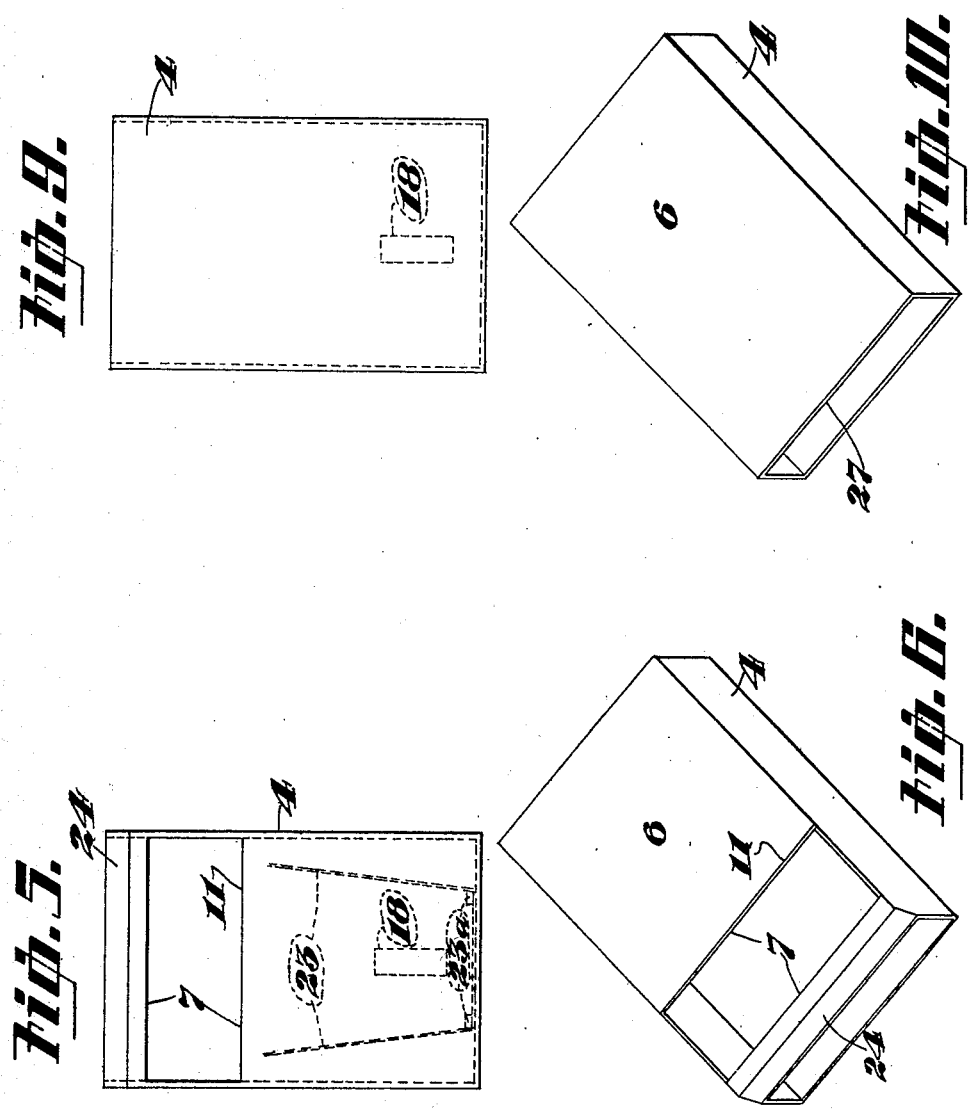

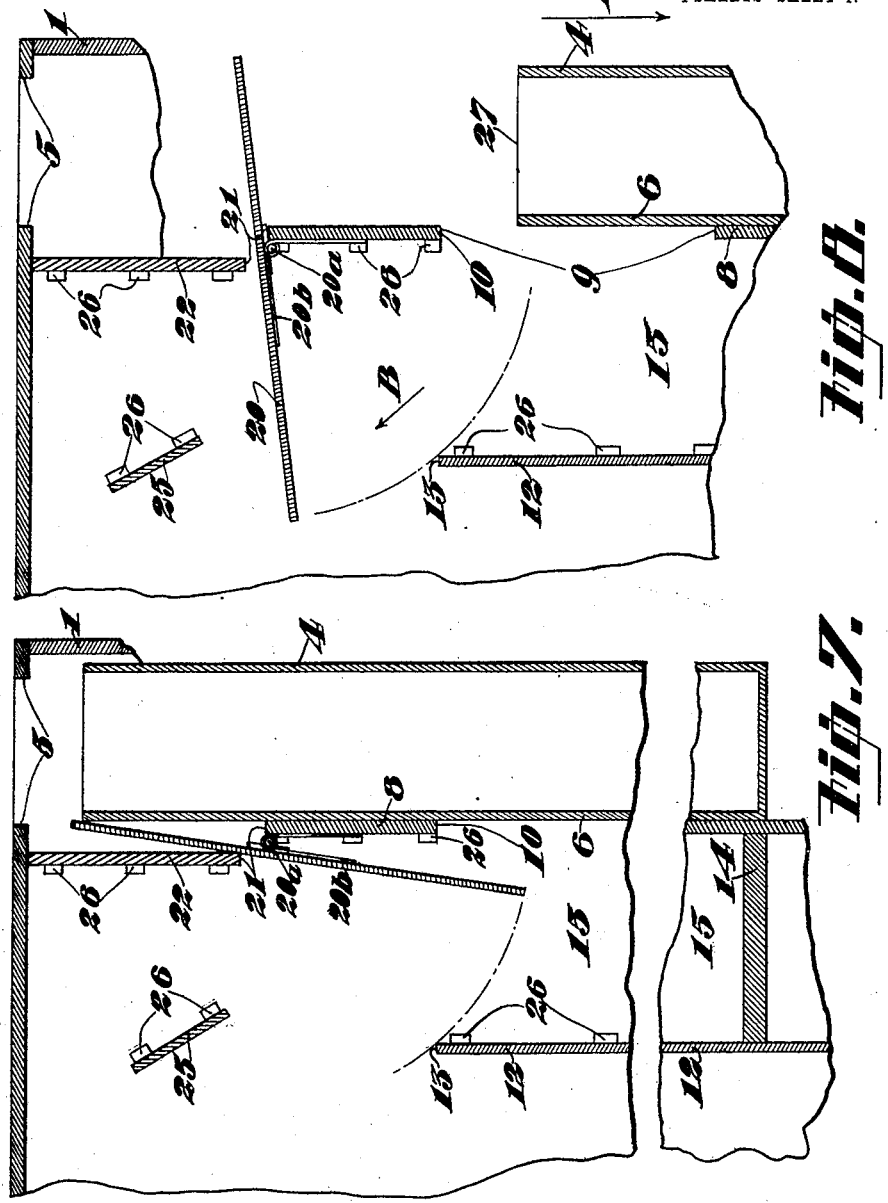

UNITED STATES PATENT OFFICE.

RICHARD R. RICKETTS, OF SPRINGFIELD, MISSOURI, ASSIGNOR TO SPRINGFIELD SEED COMPANY, OF SPRINGFIELD, MISSOURI, A CORPORATION OF MISSOURI.

DISPENSING-RECEPTACLE.

No. 916,783.  Specification of Letters Patent.  Patented March 30, 1909.

Application filed June 8, 1908. Serial No. 437,235.

*To all whom it may concern:*

Be it known that I, RICHARD R. RICKETTS, a citizen of the United States, residing at the city of Springfield, in the county of Greene and State of Missouri, have invented certain new and useful Improvements in Dispensing-Receptacles, of which the following is a specification, reference being had therein to the accompanying drawings.

This invention relates to dispensing-receptacles, and has for its object to provide an article of this kind by which a predetermined quantity of the contents of the receptacle can be dispensed at each operation.

The invention is particularly well adapted for use by merchants who retail a certain article in very small quantities, and who wish to measure accurately the amount of goods delivered to each customer without having to weigh each lot sold.

As one example of the uses to which the invention may be applied, the same is hereinafter referred to as a device for dispensing seeds, though the receptacle may contain and dispense any other substance of a granular nature, or even a liquid.

The invention forming the subject-matter of this application resembles, in many respects, the invention shown and described in the pending application of Alfred S. E. Sanders, Serial No. 431,536, filed May 7, 1908.

In the drawings forming part of this specification, in which like characters of reference denote like parts wherever they occur, Figure 1 is a front elevation of one of the receptacles, various interior parts being shown in dotted lines; Fig. 2 is an elevation of the right hand end, Fig. 1; Fig. 3 is a section on the line 3—3, Fig. 2, with slight modifications; Fig. 4 is a section on the line 4—4, Fig. 3, looking toward the left of said figure; Fig. 5 is an elevation of the movable chute; Fig. 6 is a perspective view of the movable chute; Fig. 7 is an enlarged sectional view of the parts shown in the upper right hand corner of Fig. 3 the guard being shown in a slightly modified form and with a modified form of delivery chute; Fig. 8 is a view similar to Fig. 7, showing the same parts after the chute has been moved in the direction of the arrow A and the scraper in the direction of the arrow B; Fig. 9 is an elevation of a modified form of delivery chute; and Fig. 10 is a perspective view of the member shown in Fig. 9.

The walls 1 of the receptacle may be made of any suitable sheet-material, and may be provided with an aperture 2 in which a transparent member 3 is held, through which member any one can see what the receptacle contains and to what extent it is filled. Within the receptacle is a slidable chute 4, which is located in registration with an aperture 5 in one end (preferably the top) of the receptacle, and which can be moved a predetermined distance toward or away from said apertured end of the receptacle, the position to which the chute is moved governing the quantity of seeds dispensed at any one operation. The chute is open at the end nearest aperture 5, preferably closed at the opposite end, and, in that wall 6 thereof next to the main seed-holding part of the receptacle, is provided with an aperture 7 through which the seeds to be dispensed pass into the chute, which seeds, when having once entered the chute, can pass thereout through the open end thereof and through the aperture 5 when the receptacle is inverted. Since the aperture 5 is the only exit from the receptacle, and since access to this exit is permitted only through the chute 4, it is obvious that, by regulating the quantity of seeds permitted to pass through aperture 7 into the chute, the amount of seeds dispensed at any operation is thereby controlled.

Extending from front to back of the receptacle is a guard or partition 8, against which guard wall 6 of the chute bears, the aperture 7 in said wall 6 being normally closed by said guard and passage of the seeds into the chute thereby prevented. In said partition (see Figs. 7 and 8), however, is an aperture 9, and when the chute 4 is properly moved, as hereinafter described, from the position shown in Figs. 1, 3, and 7 to that shown in Fig. 8, aperture 7 comes into registration with aperture 9, and the seeds on the left hand side of member 8, Figs. 1 and 3, can pass through the space between the top edge 10 of aperture 9 and the bottom edge 11 of aperture 7, the distance between said edges determining the quantity of seeds which can enter the chute 4 at any operation. If desired, the walls of the chute can, of course, be made solid, as shown in Figs. 9 and 10, and the chute filled by moving the same to a point where its mouth 27 is beyond the edge 10 (see Figs. 7 and 8). In such cases, the seeds merely pass between the edge 10 and the mouth of the chute. It is entirely feasible, also, to omit that part of member 8 below the aperture 9, chute-wall 6 in such cases serving exactly the same function as that part of said member 8 (see Fig. 3).

Extending from front to back of the receptacle, and preferably lying in a plane parallel to chute-wall 6, is a partition 12, the top edge 13 of which is approximately as high as the edge 10 of aperture 9, and the seeds, therefore, must necessarily pass over said edge 13 before they can enter the chute. Extending from partition 8 to partition 12 is a floor 14, which floor, together with the partitions 8 and 12 and the front and back of the receptacle, forms a chamber 15 into which the seeds pass before entering chute 4, and from said chamber 15 the seeds can pass into the chute whenever the chute has been moved to a point where the entrance to the chute is no longer covered over by the guard 8.

The chute 4 is normally held as closely as possible to the aperture 5 either by a resilient cord 16 fastened to the inner side of a wall 1 and to any convenient part of the chute (the cord being so located that no part thereof is visible from the outside), or by an expansion spring 23$^b$ placed between the end of the receptacle opposite the aperture 5 and the adjacent end of the chute, and, therefore, access of the seeds from chamber 15 to the interior of the chute is normally prevented, since the entrance to the chute, when in normal position, is closed by the guard 8. When, however, the chute is so moved that edge 11 of aperture 7 (or, in the alternative construction, the mouth 27 of the chute) is beyond edge 10 of aperture 9, this movement being in the direction of arrow A and against the resistance of resilient member 16 or 23$^b$, the seeds are permitted to pass between the edge 10 of guard 8 and edge 11 of aperture 7 and into the interior of the chute 4, reference being made from henceforth only to the preferred form, in which the chute is apertured at 7. The wall 1 against which chute 4 bears is slotted at 17, and a stud 18 fastened to the chute projects through the slot. The operator, in order to move the chute, takes hold of stud 18 with his fingers and presses thereupon in the direction of said arrow A, thus, obviously, carrying the chute therewith. Since, as stated above, the distance between the edges 10 and 11 regulates the quantity of seeds which can pass into the chute at any one operation, and since this distance, in turn, depends upon the extent of movement communicated to the chute, it is obvious that the position assumed by the chute determines the amount of seeds to be dispensed at any one operation. If, for example, the chute be moved to a point where the distance between edges 10 and 11 is, say, half an inch, half an ounce of seeds can pass into the chute at each operation; if the distance be an inch, one ounce of seeds will so pass; and so on. In order to show the merchant exactly to what point the chute must be moved in order to dispense the quantity of seeds required, a suitable scale is marked upon the outside of the slotted wall 1, with the lines of which scale (said lines being spaced apart different distances for different kinds of seeds) a mark 19 on the stud 18 is adapted to register, thereby indicating either the weight or the monetary value of the seeds which will pass out of the main part of the receptacle and into the chute at any operation.

A wing or scraper 20 is provided, said wing being supported upon a rod 20$^a$, which rod is held either by the front and back of the receptacle or by guard 8, said scraper passing through a slot 21 in guard 8 and being of such length that its lowest edge, Figs. 1 and 7, will just pass over the top edge 13 of partition 12. In case the seeds in the chamber 15, therefore, stand at a level higher than edge 13, or if any seeds should remain resting upon said edge, movement of the scraper in the direction of arrow B, Fig. 8, will force such seeds back into the main part of the receptacle, leaving only a predetermined quantity of seeds within the chamber 15. That part 22 of the guard 8 above the slot 21 is not in the same plane as the part below, part 22 being set back a sufficient distance farther from the slotted wall 1 than the main part of the guard is, in order to permit the scraper 20 to assume a position in which it is practically parallel to the slotted wall 1. Thus, when the scraper 20 is in the position shown in Figs. 1 and 7, the distance from the slotted wall to the top edge of the scraper 20 is the same as the distance from said wall to that part of the guard 8 below the slot 21, and thus the passageway in which the chute 4 slides is uniform throughout in width.

To the scraper 20 is fastened one end of a resilient cord 23 or a spring, the other end of same being secured to the chute 4 by strap-like fasteners 23$^a$, this resilient member, too, being invisible from the outside. In lieu of cord 23, a suitable spring 20$^b$ may be mounted upon guard 8, one end of said spring engaging wing 20 and tending to move same in the direction of arrow B. As the chute is moved in the direction of arrow A, the scraper is thereby caused to swing upon its pivot in the direction of arrow B, the relative position of the parts before and after such movement being shown in Figs. 7 and 8, respectively. Hence, before the aperture 7 comes into registration with the aperture 9, thus enabling the seeds to pass from the chamber 15 into the chute 4, the scraper 20 has removed all seeds in excess of a predetermined quantity from chamber 15. When the chute is allowed to move under the action of resilient member 16 in the direction indicated by arrow C, the end of said chute, which is preferably beveled at 24, bears upon that part of the scraper which is disposed in the path of travel of the chute, and, as the chute continues to move, it forces the scraper back to the position shown in Figs. 1 and 7.

A deflector 25 is placed vertically above partition 12, to prevent packing of the seeds in the corner formed by the upper end 22 of guard 8 and the top of the receptacle, said deflector being set obliquely to partition 12.

Where the parts are made of sheet metal, they may be fastened to the walls of the receptacle and to each other by solder-points 26.

The partition 12 preferably extends below the floor 14 to the lower right hand edge 27 (Fig. 1) of the receptacle, thereby preventing packing of the seeds in that corner, beneath the floor 14 and chute 4, and the part 22 of guard 8, though preferably integral with the main part thereof, may be a separable member, as in Figs. 7 and 8.

From the foregoing detailed description of parts, it will be seen that only those seeds which are in the chamber 15 can pass out of the receptacle, and even then only when allowed access to the chute 4, and that the seeds can enter the chute only when the chute is moved to a point where apertures 7 and 9 are in registration. When the merchant is about to make a sale, therefore, he ascertains the amount of seeds desired by his customer, moves the chute in the direction of arrow A until the mark 19 on stud 18 indicates that the proper position has been reached, thus bringing the edge 11 below the edge 10. If there are any seeds in the chamber 15, the proper quantity thereof will pass through registering apertures 7 and 9 from the chamber into chute 4 when the chute is held in the position (shown in Fig. 8) to which it has been moved in the direction of arrow A. The operator thereupon releases the chute 4, which is quickly carried by the resilient member 16 in the direction of arrow C to the position shown in Figs. 1 and 7 (there being no obstruction at edge 10), thus closing the entrance to the chute and making it impossible for any seeds except the predetermined quantity within chute 4 to pass out of the receptacle. Finally, the receptacle is turned so that aperture 5 is carried in the arc of a circle (in the direction indicated by arrow D) to a point where the receptacle is practically bottom side up, passing, of course, through the position where the chute 4 and partitions 8 and 12 are horizontally disposed, but ultimately delivering the seeds in the chute through aperture 5. At such times as the receptacle contains so many seeds that the seeds stand higher than edge 13 of partition 12, enough seeds will fall into the chamber 15 by gravity to keep the chamber 15 approximately filled at all times, but when there are fewer seeds than that the chamber 15 must be filled by act of the operator. This is accomplished by turning the receptacle first to the position where it is disposed horizontally or obliquely with the top of the receptacle downward, so that the seeds rest upon what are then the upper sides of partition 12, part 22 of guard 8, scraper 20, and deflector 25, and then turning the receptacle back to upright position. Because of this second movement, the seeds resting upon the guard, scraper, and deflector will slide thereoff and into the chamber 15. In inverting the receptacle, however, to deliver the seeds which have passed into chute 4, the receptacle is necessarily carried through the horizontal position; hence, the chamber 15 will ordinarily be kept approximately filled with seeds because of the movements necessarily given to the receptacle each time a sale is made, and it will practically never be necessary to perform a separate operation to fill chamber 15. It is obvious, also, that the moving of the chute from the position shown in Fig. 7 to the position shown in Fig. 8, and the subsequent inverting of the receptacle are performed in practically continuous succession, the merchant makes a sale—i. e., removes the seeds from the receptacle, measures them, and places them in the bag in which the seeds are carried away by the customer—by a single operation.

The receptacle is filled with seeds before the bottom is secured to the walls; for after said parts are all secured together and sealed it is very difficult, and almost impossible, to introduce more seeds into the receptacle unless the walls be cut or broken. The receptacles, accordingly, can hardly be refilled.

Having thus described my said invention, what I claim and desire to secure by Letters-Patent is,

1. In a device of the character described, the combination of a receptacle, a movable chute therein, said chute being apertured, and a guard normally closing said chute and located adjacent the chute, the interior of said chute and the interior of said receptacle having communication with each other when said chute is moved with its aperture beyond said guard.

2. In a device of the character described, the combination of a receptacle, a movable chute therein, said chute being apertured, a guard, and resilient means normally holding said chute so that said aperture is behind said guard, the interior of said chute and the interior of said receptacle having communication with each other when the chute is moved to a point where its aperture is partly clear of said guard.

3. In a device of the character described, the combination of a receptacle, a movable chute therein, said chute being apertured, a seed-receiving chamber within said receptacle, a wall of said chamber being apertured, and means by which said chute can be moved to a point where said apertures are in registration, thereby to permit communication between said chute and said chamber.

4. In a device of the character described, the combination of a receptacle, a movable chute therein, said chute being apertured, a seed-receiving chamber within said receptacle, a wall of said chamber being apertured, and grasping means upon said chute by which said chute can be moved to a point where said apertures are in registration, thereby to permit communication between said chute and said chamber.

5. In a device of the character described, the combination of a receptacle, a movable chute therein, said chute being apertured, a seed-receiving chamber within said receptacle, a wall of said chamber being apertured, and grasping means upon said chute and projecting therefrom outside the receptacle by which means said chute can be moved to a point where said apertures are in registration, thereby to permit communication between said chute and said chamber.

6. In a device of the character described, the combination of a receptacle, a movable chute therein, said chute being apertured, a seed-receiving chamber within said receptacle, said chute normally bearing against one wall of said chamber, the aperture in said chute normally being closed by said wall, said wall being apertured, and means by which said chute can be moved to a point where said apertures are in registration, thereby to permit communication between said chute and said chamber.

7. In a device of the character described, the combination of a receptacle, a movable chute therein, said chute being apertured, a seed-receiving chamber within said receptacle, and means actuated by the chute for removing the excess of seeds from said chamber, seeds from the chamber being adapted to pass into the chute through the aperture therein.

8. In a device of the character described, the combination of a receptacle, a movable chute therein, said chute being apertured, a seed-receiving chamber within said receptacle, and a pivoted scraper actuated by the chute for removing the excess of seeds from said chamber, seeds from the chamber being adapted to pass into the chute through the aperture therein.

9. In a device of the character described, the combination of a receptacle, a movable chute therein, said chute being apertured, a seed-receiving chamber within said receptacle, and a pivoted scraper actuated by the chute for removing the excess of seeds from said chamber, there being a resilient connection between said chute and said scraper, seeds from the chamber being adapted to pass into the chute through the aperture therein.

10. In a device of the character described, the combination of a receptacle, having an aperture in one wall thereof, a movable chute therein, said chute being in registration with said aperture and a guard within the receptacle normally preventing access to the chute, said chute having communication with the interior of said receptacle when said chute is moved to a point when the entrance to said chute is clear of said guard.

11. In a device of the character described, the combination of a receptacle, having an aperture in one wall thereof, a movable chute therein, said chute being in registration with said aperture, and a guard within the receptacle adjacent the apertured end thereof normally preventing access to the chute, said chute having communication with the interior of said receptacle when said chute is moved to a point when the entrance to said chute is clear of said guard.

12. In a device of the character described, the combination of a receptacle having an aperture in one wall thereof, a movable chute therein, said chute being in registration with said aperture, a guard within the receptacle normally preventing access to the chute, resilient means normally holding said chute in a position where the entrance thereto is behind said guard, the interior of said chute and the interior of said receptacle having communication with each other when said chute is moved to a point where the entrance to said chute is clear of said guard.

13. In a device of the character described, the combination of a receptacle, a movable chute therein, said chute being apertured, a seed-receiving chamber within said receptacle, and a scraper extending into said chamber and adapted to travel past and in proximity to one edge of one wall of said chamber, said scraper being actuated by said chute to remove the excess of seeds from said chamber, seeds from the chamber being adapted to pass into the chute through the aperture therein.

14. In a device of the character described, the combination of a receptacle having a discharge aperture in one wall thereof, a movable chute therein, said chute being in registration with said discharge-aperture, a seed-measuring chamber within said receptacle, a guard within the receptacle normally preventing access of seeds to the chute, and movable means pivoted to said guard and adapted to travel to a position approximately perpendicular to said guard, said movable means during its travel being caused by the movement of said chute to coöperate with one wall of said seed-measuring chamber and to remove the excess of seeds from proximity to the guard.

15. In a device of the character described, the combination of a receptacle having a discharge aperture in one wall thereof, a movable chute therein, said chute being in registration with said discharge-aperture, a seed-measuring chamber within said receptacle, a slotted guard within the receptacle normally preventing access of seeds to the chute, and movable means extending through said slot in said guard and adapted to travel to a position approximately perpendicular to said guard, said movable means during its travel being caused by the movement of said chute to coöperate with one wall of said seed-measuring chamber and to remove the excess of seeds from proximity to the guard.

16. In a device of the character described, the combination of a receptacle having a discharge aperture in one wall thereof, a movable chute therein, said chute being in registration with said discharge-aperture, a seed-measuring chamber within said receptacle, a guard within the receptacle normally preventing access of seeds to the chute, and movable means actuated upon movement of the chute to travel to a position approximately perpendicular to said guard, said movable means during its travel being caused by the movement of said chute to coöperate with one wall of said seed-measuring chamber and to remove the excess of seeds from proximity to the guard.

17. In a device of the character described, the combination of a receptacle having a discharge aperture in one wall thereof, a movable chute therein, said chute being in registration with said discharge-aperture, a seed-measuring chamber within said receptacle, a slotted guard within the receptacle normally preventing access of seeds to the chute, and movable means actuated upon movement of the chute and extending through said slot in said guard and adapted to travel to a position approximately perpendicular to said guard, said movable means during its travel being caused by the movement of said chute to coöperate with one wall of said seed-measuring chamber and to remove the excess of seeds from proximity to the guard.

18. In a device of the character described, the combination of a receptacle, a movable chute therein, a seed-measuring chamber within said receptacle, a scraper adapted to coöperate with one wall of said seed-measuring chamber and to remove the excess of seeds from the proximity of the entrance to said chute, and means to move the scraper simultaneously with the movements of the chute.

19. In a device of the character described, the combination of a receptacle, a movable chute therein, a seed-measuring chamber within said receptacle, a scraper adapted to coöperate with one wall of said seed-measuring chamber and to remove the excess of seeds from the proximity of the entrance to said chute, and resilient means connecting said scraper to said chute.

20. In a device of the character described, the combination of a receptacle, a movable chute therein, a seed-measuring chamber within said receptacle, a scraper adapted to coöperate with one wall of said seed-measuring chamber and to remove the excess of seeds from the proximity of the entrance to said chute, and resilient means connecting said scraper to said chute, a strap-like member being secured to the chute to hold said resilient member in connection therewith.

21. In a device of the character described, the combination of a receptacle, a seed-measuring chamber within said receptacle, a movable chute also within said receptacle, the discharge end of said chute being beveled, and a movable scraper against which said beveled end is adapted to bear, said scraper, upon movement of said chute, being caused to travel to a position approximately perpendicular to the length of said chute, said scraper, in its said travel, being caused by the movement of said chute to coöperate with one wall of said seed-measuring chamber and to remove the excess of seeds from the proximity of the entrance to said chute.

22. In a device of the character described, the combination of a receptacle, a movable chute therein, an apertured chamber within said receptacle from which the seeds enter the chute, the outer wall of said chamber being approximately on a level with the upper edge of said aperture, and means by which said chute can be moved to a point where the interior of the chute has communication through said aperture with said chamber.

23. In a device of the character described, the combination of a receptacle, a movable chute therein, an apertured chamber within said receptacle from which the seeds enter the chute, the outer wall of said chamber being approximately on a level with the upper edge of said aperture, and a movable scraper which is caused by the movement of said chute to travel to a position approximately perpendicular to the upper edge of said aperture and to pass over the top of said chamber.

24. In a device of the character described, the combination of a receptacle, a seed-measuring chamber within said receptacle, a movable chute also within said receptacle, resilient means connecting said receptacle to said chute, a scraper adapted to coöperate with one wall of said seed-measuring chamber and to remove the excess of seeds from the vicinity of the entrance to the receptacle, and resilient means connecting said chute to said scraper, both of said resilient means being invisible from the exterior of the receptacle.

25. In a device of the character described, the combination of a receptacle, an apertured guard therein so located as to leave a space between said guard and one of the walls of the receptacle, one of the other walls having a discharge-aperture in registration with said space, and a member slidable parallel to said guard and adapted to control the aperture therethrough, said space and the main part of said receptacle having communication with each other when said member is moved to a point where said aperture is open.

26. In a device of the character described, the combination of a receptacle, an apertured guard therein so located as to leave a space between said guard and one of the walls of the receptacle, one of the other walls having a discharge-aperture in registration with said space, and an apertured member slidable parallel to said guard and adapted to close the aperture in said guard, said space and the main part of said receptacle having communication with each other when said apertured member is moved to a point where its aperture and the aperture in said guard are in registration.

27. In a device of the character described, the combination of a receptacle, a guard therewithin so located that a space is left between said guard and one of the walls of the receptacle, one of the other walls having a discharge-aperture in registration with said space, there being a passageway into said space through said guard, and a member slidable parallel to said guard and normally closing said passageway, said space and the main part of said receptacle having communication with each other when said member is moved clear of said guard.

28. In a device of the character described, the combination of a receptacle, a seed-measuring chamber within said receptacle, a guard also within said receptacle so located that a space is left between said guard and one of the walls of the receptacle, one of the other walls having a discharge-aperture in registration with said space, a movable member within said space, there being a passageway through said guard from said space to the main part of said receptacle, and means which move in connection with said movable member and in coöperation with one wall of said seed-measuring chamber for removing the excess of seeds from the proximity of said passageway.

In testimony whereof I have affixed my signature in presence of two witnesses.

RICHARD R. RICKETTS.

Witnesses:
ALFRED S. E. SANDERS,
T. H. SANDERS.